US008683576B1

(12) United States Patent
Yun

(10) Patent No.: US 8,683,576 B1
(45) Date of Patent: Mar. 25, 2014

(54) SYSTEMS AND METHODS FOR DETECTING A PROCESS TO ESTABLISH A BACKDOOR CONNECTION WITH A COMPUTING DEVICE

(75) Inventor: James Yun, Hacienda Heights, CA (US)

(73) Assignee: Symantec Corporation, Mountain View, CA (US)

( * ) Notice: Subject to any disclaimer, the term of this patent is extended or adjusted under 35 U.S.C. 154(b) by 732 days.

(21) Appl. No.: 12/571,121

(22) Filed: Sep. 30, 2009

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)

(52) U.S. Cl.
USPC .......................................................... 726/17

(58) Field of Classification Search
USPC .......................................................... 726/17
See application file for complete search history.

(56) References Cited

U.S. PATENT DOCUMENTS

| 5,623,666 | A  | * | 4/1997  | Pike et al.      | 1/1     |
|-----------|----|---|---------|------------------|---------|
| 6,192,394 | B1 | * | 2/2001  | Gutfreund et al. | 709/204 |
| 6,295,439 | B1 | * | 9/2001  | Bejar et al.     | 434/350 |
| 6,941,522 | B2 | * | 9/2005  | Brown            | 715/772 |
| 7,533,370 | B2 | * | 5/2009  | Nave et al.      | 717/126 |
| 7,784,098 | B1 | * | 8/2010  | Fan et al.       | 726/25  |
| 7,877,781 | B2 | * | 1/2011  | Lim              | 726/1   |
| 2006/0282827 | A1 | * | 12/2006 | Yeap et al.    | 717/130 |
| 2008/0086700 | A1 | * | 4/2008  | Rodriguez et al. | 715/804 |

* cited by examiner

*Primary Examiner* — Dant Shaifer Harriman
(74) *Attorney, Agent, or Firm* — Holland & Hart LLP

(57) ABSTRACT

A computer-implemented method for detecting a process to establish a backdoor connection with the computer is described. An application programming interface (API) is hooked. Calls to the hooked API are monitored. A call directed to the hooked API is intercepted. The call instructs the API to initiate a user interface. Structures included in the intercepted call are analyzed. The intercepted call is prevented from arriving at the hooked API if the structures are directed to a socket on the computer.

18 Claims, 6 Drawing Sheets

SYSTEMS AND METHODS FOR DETECTING A PROCESS TO ESTABLISH A BACKDOOR CONNECTION WITH A COMPUTING DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Computer technologies used by consumers and by the business world continue to demand that the efficiency of these technologies increase. These demands have included demands to improve security related to sensitive information that may be shared between users of computers. For example, a user may desire to protect certain content that is shared with other users such that the content is not altered, deleted, shared with unauthorized users, etc.

Malicious users of computing devices may attempt to remotely control another computing device. These users may desire to gain control of another device in order to obtain access to sensitive information that may be stored within the attacked computing device. Remote control of a computing device may be achieved through backdoor connections such that the user of the controlled device is not aware that a malicious user has gained access to his/her computing device.

From the above discussion, benefits may be realized by providing systems and methods for detecting and preventing unwanted control of a computing device by another device. In particular, benefits may be realized by providing systems and methods for detecting a process to establish a backdoor connection with a computing device.

SUMMARY

According to at least one embodiment, a computer-implemented method for detecting a process to establish a backdoor connection with the computer is described. An application programming interface (API) is hooked. Calls to the hooked API are monitored. A call directed to the hooked API is intercepted. The call instructs the API to initiate a user interface. Structures included in the intercepted call are analyzed. The intercepted call is prevented from arriving at the hooked API if the structures are directed to a socket on the computer.

In one embodiment, the hooked API may be a CreateProcess API. The structures included in the intercepted call may include STARTUPINFO structures. In one embodiment, the STARTUPINFO structures include standard input (hStdInput), standard output (hStdOutput), and standard error (hStdError) structures.

The user interface may be a shell command prompt. The occurrence of the intercepted call may be reported to a security product. In one configuration, the security product is installed on a server in communication with the computer via a network connection. The intercepted call may be used to implement a bindshell process.

A computer system configured to detect a process to establish a backdoor connection with the computer system is also described. The computer system may include a processor and memory in electronic communication with the processor. The computer system may also include a detection module configured to hook an application programming interface (API), and monitor calls to the hooked API. The detection module may also be configured to intercept a call directed to the hooked API. The call may instruct the API to initiate a user interface. The detection module may be further configured to analyze structures included in the intercepted call, and prevent the intercepted call from arriving at the hooked API if the structures are directed to a socket on the computer.

A computer-program product for detecting a process to establish a backdoor connection with a computer is also described. The computer-program product may include a computer-readable medium having instructions thereon. The instructions may include code programmed to hook an application programming interface (API), and code programmed to monitor calls to the hooked API. The instructions may also include code programmed to intercept a call directed to the hooked API. The call may instruct the API to initiate a user interface. The instructions may further include code programmed to analyze structures included in the intercepted call, and code programmed to prevent the intercepted call from arriving at the hooked API if the structures are directed to a socket on the computer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
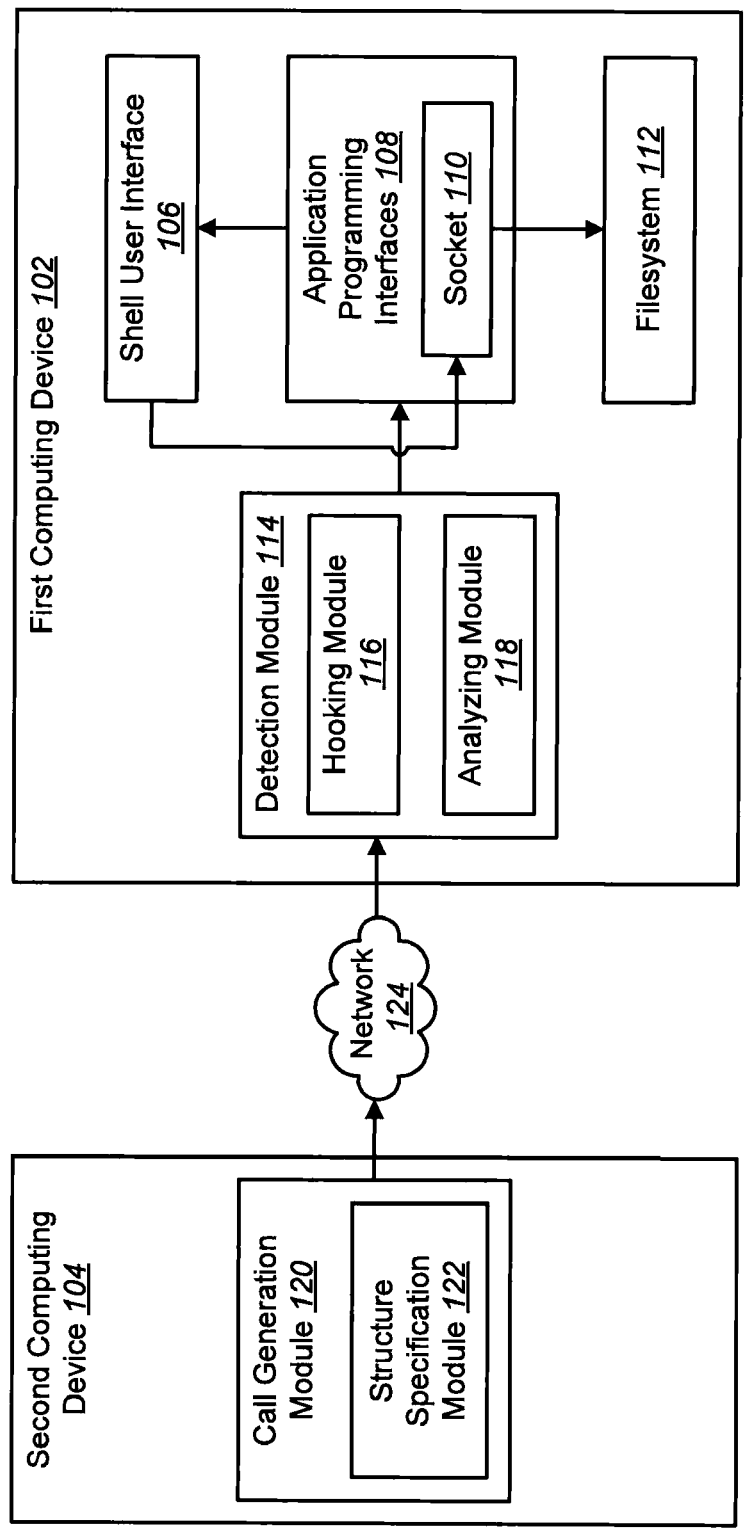
FIG. 1 is a block diagram illustrating one embodiment of a first computing device that may be under attack from a second computing device.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Bindshell is a technique that may be used by malicious parties to open a back door channel (or establish a connection) with an unsuspecting computing device. In one example, this technique may allow the malicious party to gain remote access to the computing device in order to carry out certain malicious attacks on the device. The attacking entity, for example, may call a specific application programming interface (API) to launch a shell user interface on the unsuspecting computing device. The call may include instructions that instruct certain data structures used by the shell user interface to be pointed to a particular socket within the computing device. The attacking computing device may then bind to that particular socket in order to have remote access to the filesystem of the unsuspecting computing device. The present systems and methods may provide a technique to intercept the calls to the API to launch the shell user interface. The present systems and methods may also analyze the data structures associated with the call in order to determine if the shell user interface is directed to point the data structures to a socket within the unsuspecting computing device.

FIG. 1 is a block diagram illustrating one embodiment of a first computing device 102 that may be under attack from a second computing device 104. The second computing device 104 may attempt to communicate with the first computing device in order to remotely control the first computing device 102 over a network connection 124. In one embodiment, the first and second computing devices 102, 104 may be a personal computer (PC), a laptop, a workstation, a personal digital assistant (PDA), and the like.

In one example, the second computing device 104 may include a call generation module 120 that may generate a call to send to the first computing device 102. In one configuration, the call generation module 120 may include a structure specification module 122. In one embodiment, the structure specification module 122 may specify or insert data structures or other instructions in the message being sent to the first computing device 102.

The first computing device 102 may include application programming interfaces (APIs) 108. The APIs 108 may include a socket 110 that may be used by the first computing device 102 to connect to a network, another device to receive/transmit information, and the like. The APIs 108 may launch or execute various applications and/or processes within the first computing device 102. For example, the APIs 108 may launch a shell user interface 106. The shell user interface 106 may interact with a user to receive commands to execute on the first computing device 102. In addition, the first computing device 102 may include a filesystem 112 that may be an organization of directories and subdirectories stored within the first computing device 102.

In one embodiment, the first computing device 102 may also include a detection module 114. The detection module 114 may detect calls sent from the second computing device 104. In one example, the detection module 114 may include a hooking module 116 and an analyzing module 118. The hooking module 116 may hook into the APIs 108 in order to intercept calls sent from the second computing device 104 before the calls reach the APIs 108. The analyzing module 118 may analyze certain data structures included with the intercepted call.

Figure 2:
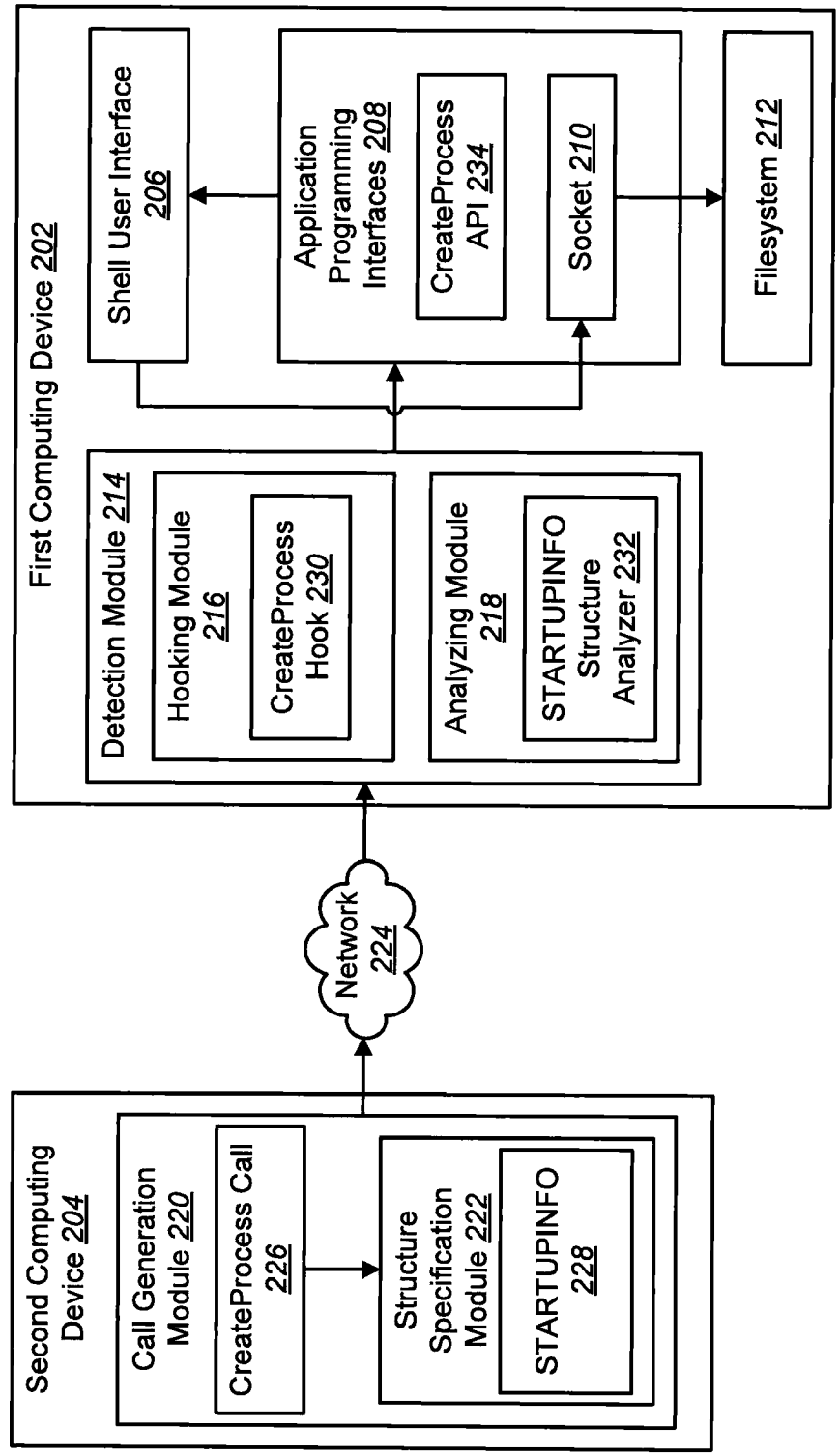
FIG. 2 is a block diagram illustrating a further embodiment of an attacking computing device attempting to remotely control a computing device across a network connection.

FIG. 2 is a block diagram illustrating a further embodiment of a computing device (such as a second computing device 204) attempting to remotely control another computing device (such as a first computing device 202). The second computing device 204 may attempt to remotely control a filesystem 212 of a first device 202 across a network connection 224. As previously explained, the second computing device 204 may include a call generation module 220. In one embodiment, the call generation module 220 may generate a CreateProcess call 226. The CreateProcess call 226 may include certain structure specifications provided by a structure specification module 222. In one example, the structure specifications associated with the CreateProcess call 226 may include STARTUPINFO 228.

The first computing device 202 may include one or more APIs 208. Examples of APIs may include a CreateProcess API 234. The APIs 208 may also include a socket 210 for receiving and transmitting information. In one embodiment, the CreateProcess API 234 may launch a shell user interface 206. An example of a shell user interface that may be launched with a CreateProcess API 234 may be a "cmd.exe" executable program.

In one configuration, the first computing device 202 may also include a detection module 214 that may detect calls originating from the second computing device 204. For example, the detection module 214 may detect "bindshell" calls sent from the second computing device 204. In one embodiment, the detection module 214 may include a hooking module 216 that may allow the detection module 214 to hook the APIs 208. In particular, the hooking module 216 may include a CreateProcess hook 230 that hooks the CreateProcess API 234. In addition, the detection module 214 may include an analyzing module 218 that analyzes certain structures included with calls generated by the second computing device 204. In one embodiment, the analyzing module 218 may include a STARTUPINFO structure Analyzer 232. The structure analyzer 232 may analyze the STARTUPINFO 228 included with the CreateProcess call 226. Examples of the STARTUPINFO structures 228 may include standard input (hStdInput), standard output (hStdOutput), and standard error (hStdError).

Figure 3:
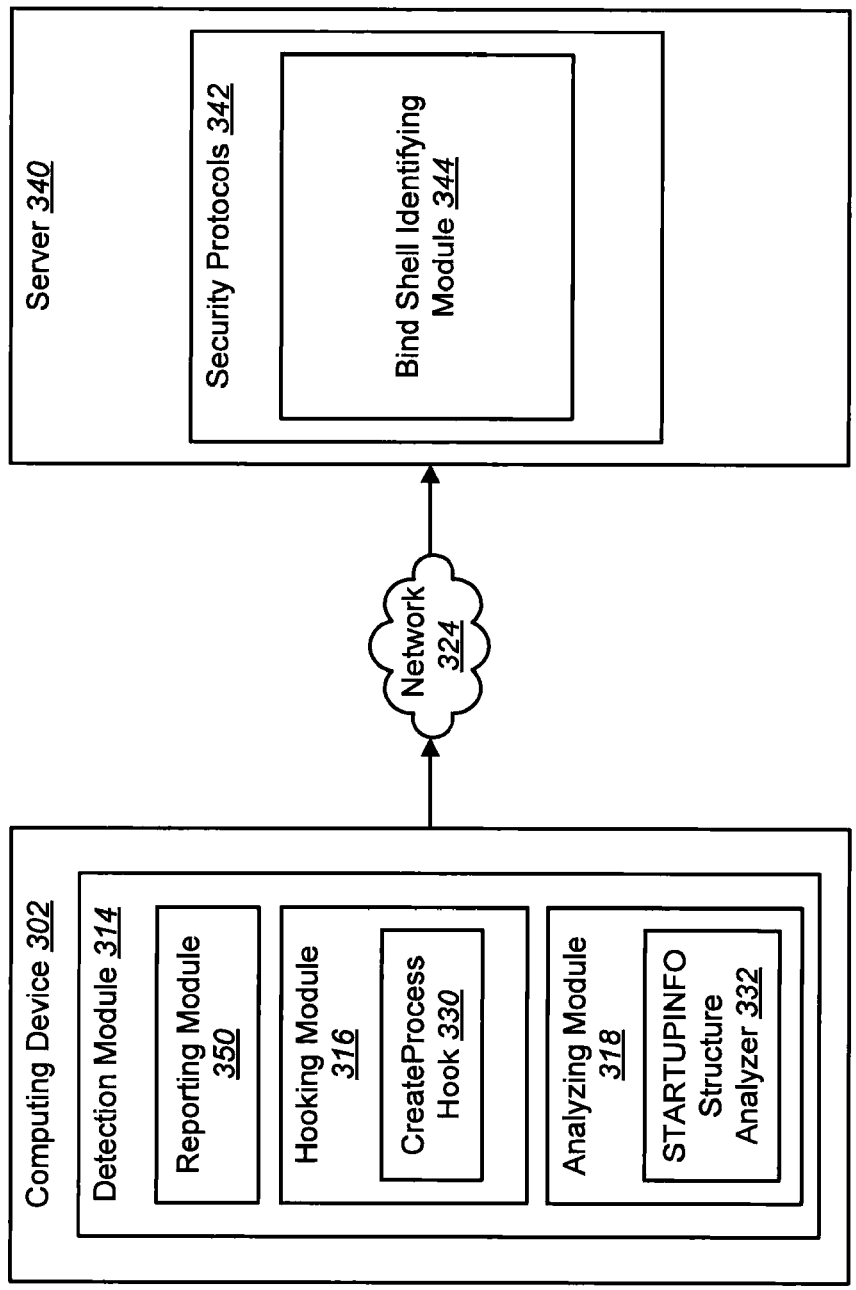
FIG. 3 is a block diagram illustrating one embodiment of a computing device communicating with a server across a network connection.

FIG. 3 is a block diagram illustrating one embodiment of a computing device 302 communicating with a server 340 across a network connection 324 to implement the present systems and methods. In one embodiment, the computing device 302 may include a detection module 314 that may detect calls (such as bindshell calls) originating from another computing device (not shown). The detection module 314 may include a hooking module 316 that may include a CreateProcess hook 330 to hook to a CreateProcess API. In addition, as previously explained, the detection module 314 may also include an analyzing module 318. The analyzing module 318 may include a STARTUPINFO structure analyzer 332. In one embodiment, the structure analyzer 332 may analyze certain structures included with a call received from another computing device (not shown).

In a further embodiment, the detection module 314 may include a reporting module 350. The reporting module 350 may transmit information regarding the call received from the other computing device (not shown) to the server 340. In one configuration, the server 340 may include security protocols 342. In one configuration, the security protocols 342 may include a bindshell identifying module 344. The identifying module 344 may identify shell back door channels that may exist or potentially exist on the computing device 102. In other words, the bindshell identifying module 344 may allow security protocols 342 to become aware of the other computing device (not shown) that sent the call. In one configuration, the protocols 342 may then take appropriate action to prevent the other computing device (not shown) from remotely controlling the computing device 102 over the network 324.

Figure 4:
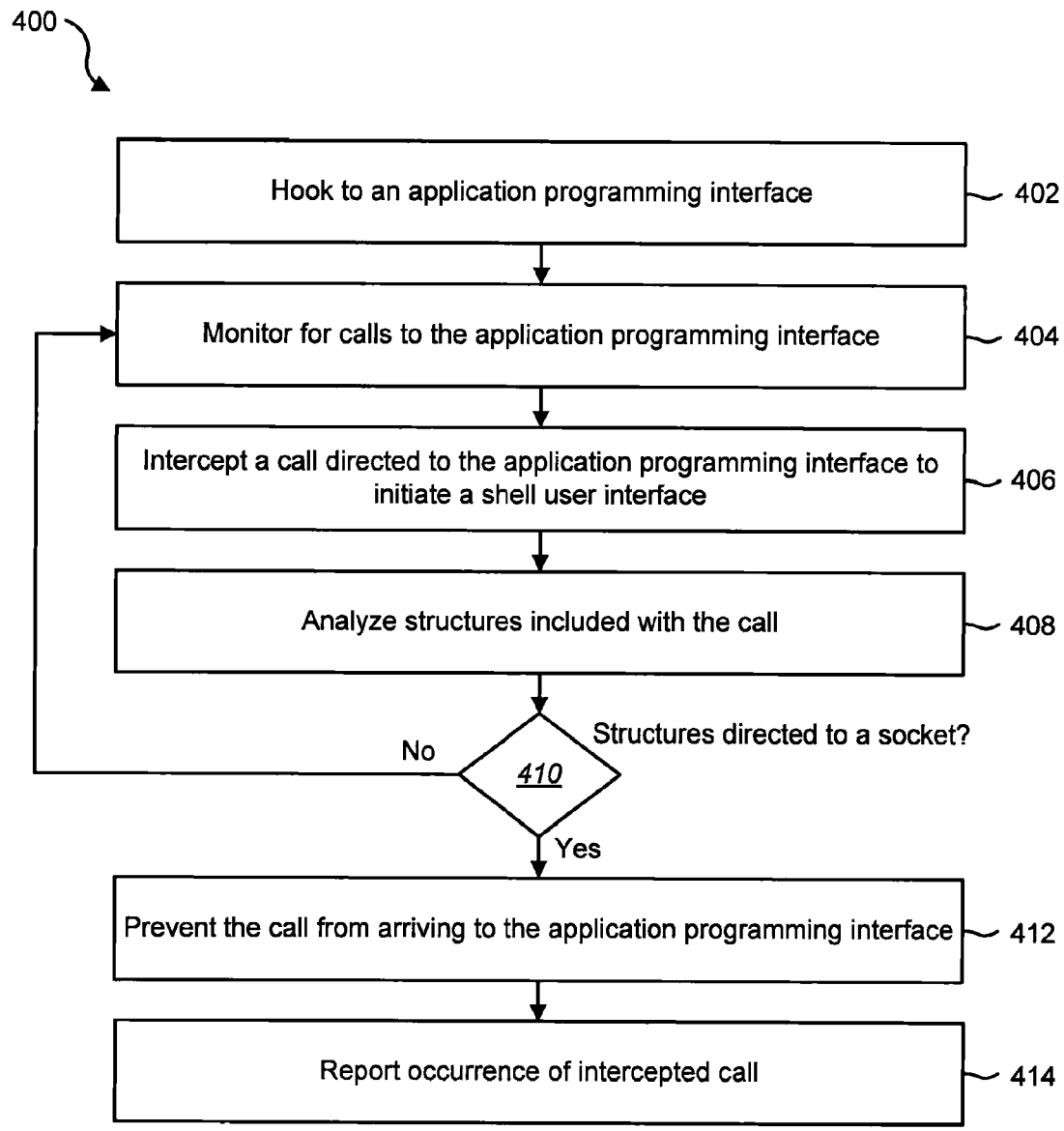
FIG. 4 is a flow diagram illustrating one embodiment of method for detecting a process to establish a backdoor connection with a computing device.

FIG. 4 is a flow diagram illustrating one embodiment of method for detecting bindshell techniques. In one configuration, the method 400 may be implemented by the detection module 114.

In one embodiment, an application program interface (API) may be hooked 402. For example, a CreateProcess API may be hooked 402 so that calls to the CreateProcess API may be intercepted. In one configuration, calls to the hooked API may be monitored 404. A call directed to the hooked API in order initiate a shell user interface may be intercepted 406. For example, a CreateProcess call may be directed to the CreateProcess API. The CreateProcess call may instruct the CreateProcess API to launch or initiate a shell user interface. An example of the shell user interface may be a "cmd.exe" executable program.

In one embodiment, structures included with the call may be analyzed 408. A determination 410 may be made as to whether these structures are directed to a socket. For example, the STARTUPINFO structures may be included with the CreateProcess call. The structures may be analyzed 408 to determine if they are being directed to a socket. Examples of the structures may include hStdInput, hStdOutput, and hStdError. In one embodiment, if it is determined 410 that the structures included in the call are directed to a socket, the call may be prevented 412 from arriving at the API. In other words, the CreateProcess call to the hooked CreateProcess API may be blocked. In addition, the occurrence of the intercepted call may be reported 414 to a security product. In one example, the security product may reside on a computing device 102 or on a server in communication with the computing device 102.

If, however, it is determined 410 that the structures included with the intercepted call are not being redirected to a socket, the method 400 may return to monitor for calls directed to the API. As a result, bindshell techniques may be detected via hooking an API, such as a CreateProcess API, and analyzing the STARTUPINFO structures included with the call to determine if a shell process is directed or instructed to redirect hStdInput, hStdOutput, and/or hStdError to a socket of the computing device 102. If the STARTUPINFO structures are successfully redirected to a socket of the computing device, an attacking computing device may remotely control the filesystem of the computing device.

Figure 5:
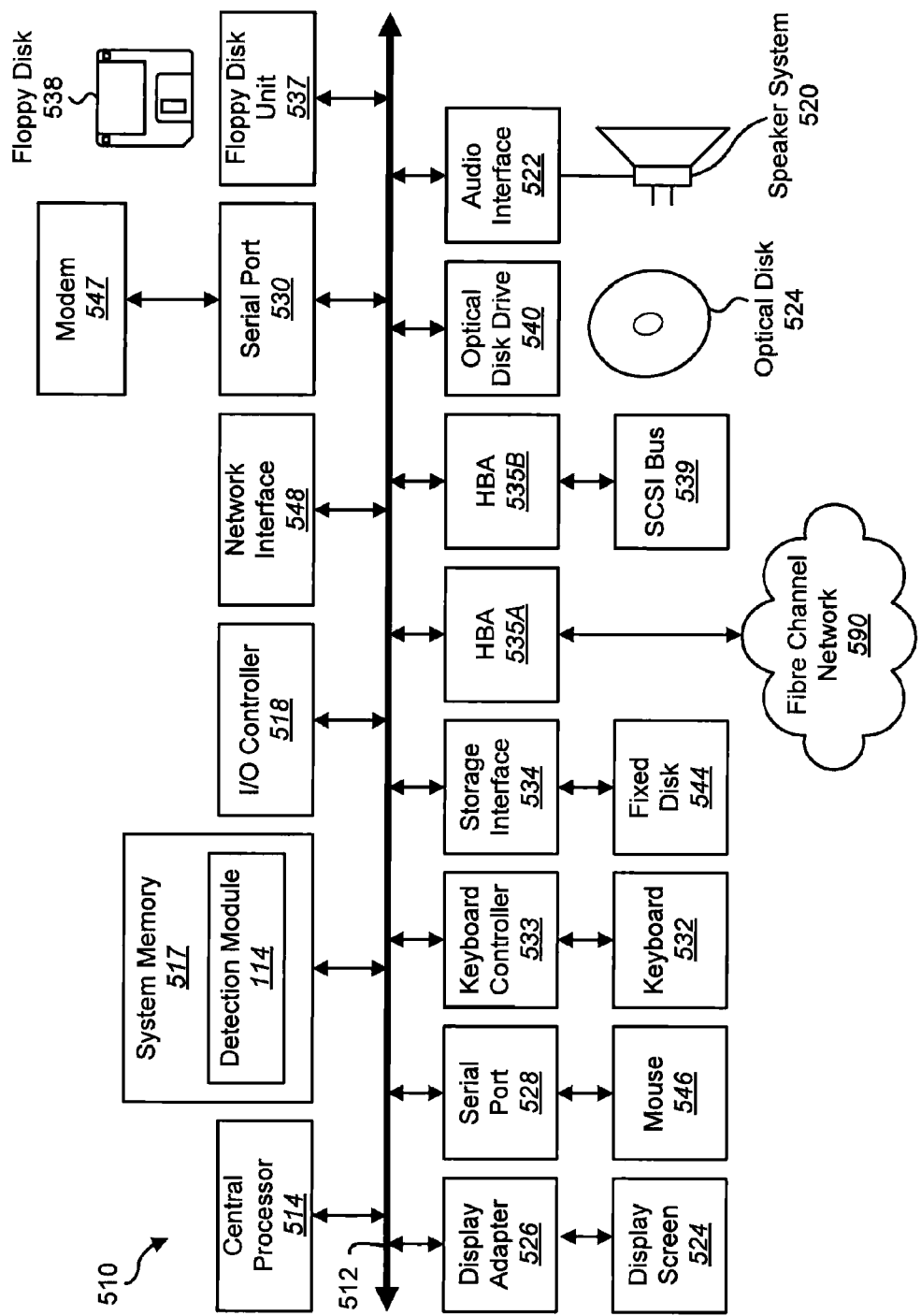
FIG. 5 depicts a block diagram of a computer system suitable for implementing the present systems and methods.

FIG. 5 depicts a block diagram of a computer system 510 suitable for implementing the present systems and methods. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the detection module 114 to implement the present systems and methods may be stored within the system memory 517. Applications resident with computer system 510 are generally stored on and accessed via a computer readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present disclosure. The devices and subsystems can be interconnected in different ways from that shown in FIG. 5. The operation of a computer system such as that shown in FIG. 5 is readily known in the art and is not discussed in detail in this application. Code to implement the present disclosure can be stored in computer-readable storage media such as one or more of system memory 517, fixed disk 544, optical disk 542, or floppy disk 538. The operating system provided on computer system 510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
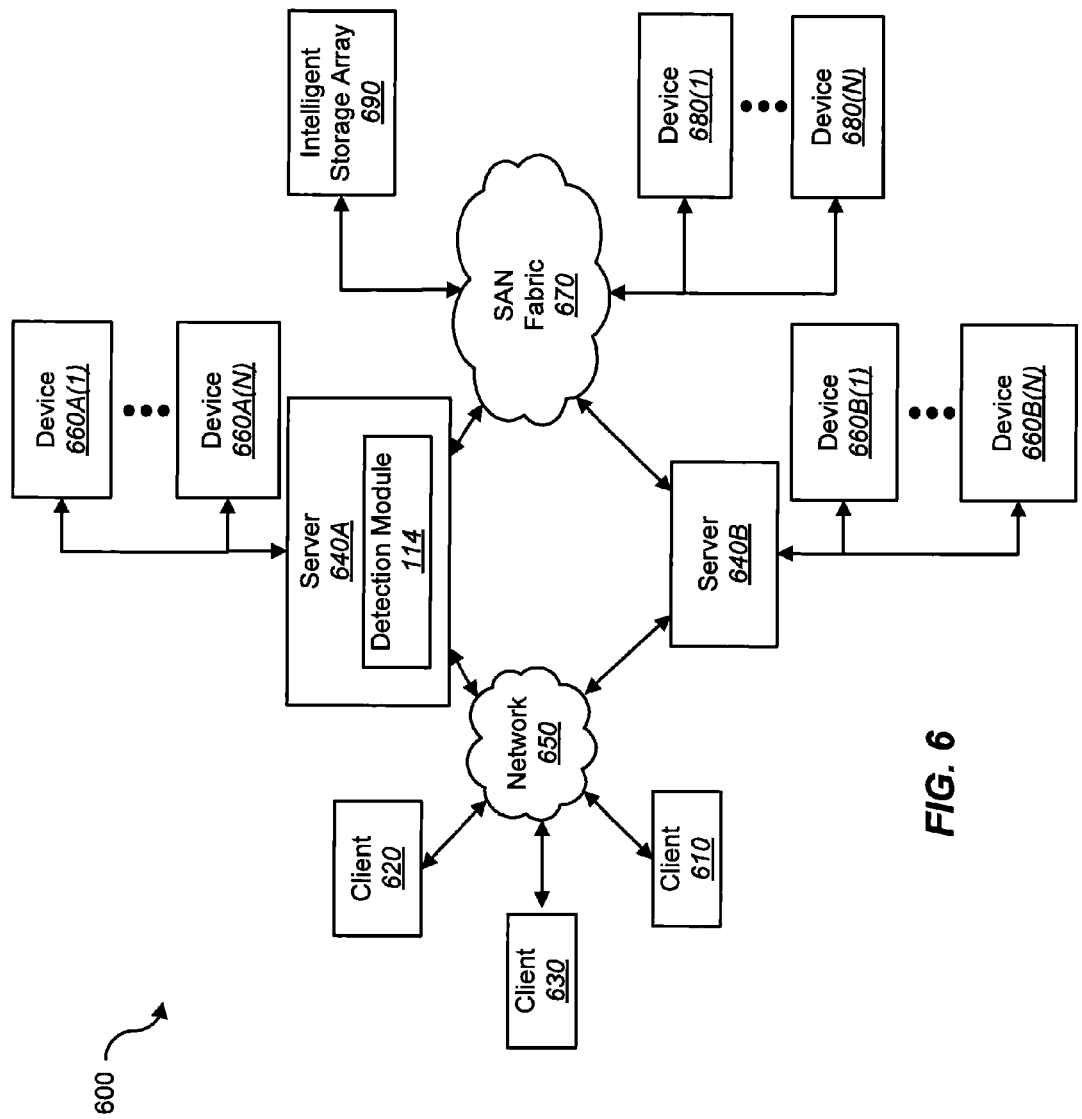
FIG. 6 is a block diagram depicting a network architecture in which client systems, as well as storage servers are coupled to a network.

FIG. 6 is a block diagram depicting a network architecture 600 in which client systems 610, 620 and 630, as well as storage servers 640A and 640B (any of which can be implemented using computer system 610), are coupled to a network 650. In one embodiment, the detection module 114 may be located within a server 640A, 640B to implement the present systems and methods. The storage server 640A is further depicted as having storage devices 660A(1)-(N) directly attached, and storage server 640B is depicted with storage devices 660B(1)-(N) directly attached. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting a process to establish a backdoor connection with the computer, comprising:
    hooking an application programming interface (API) to detect a process attempting to establish a backdoor connection with the computer, the hooked API including a socket;
    monitoring calls to the hooked API;
    intercepting a call directed to the hooked API, wherein the call instructs the API to initiate a user interface, the user interface being a shell command prompt;
    determining whether structures included in the intercepted call direct the user interface to point to the socket included in the hooked API; and
    upon determining that the structures direct the user interface to point to the socket included in the hooked API, preventing the intercepted call from arriving at the hooked API.

2. The method of claim 1, wherein the hooked API is a CreateProcess API.

3. The method of claim 1, wherein the structures included in the intercepted call comprise STARTUPINFO structures.

4. The method of claim 3, wherein the STARTUPINFO structures comprise standard input (hStdInput), standard output (hStdOutput), and standard error (hStdError) structures.

5. The method of claim 1, further comprising reporting the occurrence of the intercepted call to a security product.

6. The method of claim 5, wherein the security product is installed on a server in communication with the computer via a network connection.

7. The method of claim 1, wherein the intercepted call is used to implement a bindshell process.

8. A computer system configured to detect a process to establish a backdoor connection with the computer system, comprising:
    a processor;
    memory in electronic communication with the processor, instructions being stored in the memory and being executable by the processor to:
        hook an application programming interface (API) to detect a process attempting to establish a backdoor connection with the computer, the hooked API including a socket;
        monitor calls to the hooked API;
        intercept a call directed to the hooked API, wherein the call instructs the API to initiate a user interface, the user interface being a shell command prompt;
        determine whether structures included in the intercepted call direct the user interface to point to the socket included in the hooked API; and upon determining that the structures direct the user interface to point to the socket included in the hooked API, prevent the intercepted call from arriving at the hooked API if the structures direct the user interface to point to a socket on the computer.

9. The computer system of claim 8, wherein the hooked API is a CreateProcess API.

10. The computer system of claim 8, wherein the structures included in the intercepted call comprise STARTUPINFO structures.

11. The computer system of claim 10, wherein the STARTUPINFO structures comprise standard input (hStdInput), standard output (hStdOutput), and standard error (hStdError) structures.

12. The computer system of claim 8, wherein the instructions are further executable by the processor to report the occurrence of the intercepted call to a security product.

13. The computer system of claim 12, wherein the security product is installed on a server in communication with the computer via a network connection.

14. The computer system of claim 8, wherein the intercepted call is used to implement a bindshell process.

15. A computer-program product for detecting a process to establish a backdoor connection with a computer, the computer-program product comprising a non-transitory computer-readable storage device having instructions thereon, the instructions the instructions being executable by a processor to:

hook an application programming interface (API) to detect a process attempting to establish a backdoor connection with the computer, the hooked API including a socket;

monitor calls to the hooked API;

intercept a call directed to the hooked API, wherein the call instructs the API to initiate a user interface, the user interface being a shell command prompt;

analyze structures included in the intercepted call; and determine whether structures included in the intercepted call direct the user interface to point to the socket included in the hooked API; and upon determining that the structures direct the user interface to point to the socket included in the hooked API, prevent the intercepted call from arriving at the hooked API if the structures direct the user interface to point to a socket on the computer.

16. The computer-program product of claim 15, wherein the hooked API is a CreateProcess API.

17. The computer-program product of claim 15, wherein the structures included in the intercepted call comprise STARTUPINFO structures.

18. The computer-program product of claim 17, wherein the STARTUPINFO structures comprise standard input (hStdInput), standard output (hStdOutput), and standard error (hStdError) structures.

* * * * *